United States Patent
Araujo et al.

(10) Patent No.: US 11,748,473 B2
(45) Date of Patent: Sep. 5, 2023

(54) INTRUSION DETECTION IN MICRO-SERVICES THROUGH CONTAINER TELEMETRY AND BEHAVIOR MODELING

(71) Applicant: International Business Machines Corporation, Armonk, NY (US)

(72) Inventors: Frederico Araujo, White Plains, NY (US); Teryl Paul Taylor, Danbury, CT (US); Jiyong Jang, Chappaqua, NY (US); Will Blair, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 17/071,055

(22) Filed: Oct. 15, 2020

(65) Prior Publication Data

US 2022/0121741 A1    Apr. 21, 2022

(51) Int. Cl.
G06F 21/55 (2013.01)

(52) U.S. Cl.
CPC ...... *G06F 21/554* (2013.01); *G06F 2221/034* (2013.01)

(58) Field of Classification Search
CPC . G06F 21/554; G06F 2221/034; G06F 21/566
See application file for complete search history.

(56) References Cited

U.S. PATENT DOCUMENTS 5,621,889 A   4/1997  Lermuzeaux et al.
8,418,249 B1  4/2013  Nucci et al.
(Continued)

FOREIGN PATENT DOCUMENTS

CN   110069380 A   7/2019
CN   112000448 A   11/2020
(Continued)

OTHER PUBLICATIONS

Lei et al, "Speaker: Split-Phase Execution of Application Containers", Jun. 2017, Institute of Information Engineering, p. 1-23.*

(Continued)

*Primary Examiner* — Christopher A Revak
(74) *Attorney, Agent, or Firm* — Jeffrey S. LaBaw; David H. Judson

(57) ABSTRACT

An intrusion detection system (IDS) for a micro-services environment identifies attacks in substantially real-time and at a container-level. In this approach, behavior models are generated from container images using a binary analysis. A behavior model is a graph data structure having nodes and edges, wherein an edge represents a system call made by at least one process represented as a node in the graph data structure. The model is co-located with a running container, thereby enabling detection of anomalies as the container executes in a container environment on a hardware node. A per-container IDS function is instantiated by checking whether system call telemetry generated by an image's running container satisfies the associated behavior model that has been generated for the container image. If the telemetry indicates activity that deviates from the behavior model, an automated action is then initiated to attempt to address the attack, preferably while it is in progress.

24 Claims, 9 Drawing Sheets

(56) References Cited

U.S. PATENT DOCUMENTS

| | | | |
|---|---|---|---|
| 10,726,123 B1 * | 7/2020 | Mookiah | G06F 21/554 |
| 10,824,726 B1 * | 11/2020 | Herman Saffar | G06F 21/566 |
| 2015/0356451 A1 | 12/2015 | Gupta et al. | |
| 2016/0269482 A1 | 9/2016 | Jamjoon et al. | |
| 2017/0366416 A1 | 12/2017 | Beecham et al. | |
| 2019/0354690 A1 | 11/2019 | Brigandi | |

FOREIGN PATENT DOCUMENTS

| | | | |
|---|---|---|---|
| EP | 3805967 A1 * | 4/2021 | G06F 21/52 |
| WO | WO 2020/060537 A1 * | 3/2020 | G06F 21/55 |

OTHER PUBLICATIONS

International Search Report and Written Opinion, PCT/CN2021/117179, dated Dec. 8, 2021.

* cited by examiner

INTRUSION DETECTION IN MICRO-SERVICES THROUGH CONTAINER TELEMETRY AND BEHAVIOR MODELING

BACKGROUND OF THE INVENTION

Technical Field

This disclosure relates generally to intrusion detection in a micro-service computing environment.

Background of the Related Art

Detecting when attackers and malware infiltrate computer systems has been an outstanding problem as long as computers have been in use. Historically, Intrusion Detection Systems (IDS) have defended whole networks and individual hosts from attackers. For example, a typical Host-Based Intrusion Detection System traces system calls individual programs make to the host's kernel to detect activity that deviates from normal behavior. Normal behavior can be defined as a model extracted from an application, rules manually specified by an administrator, or models inferred from benign program traces.

Today, application developers regularly split large distributed systems into communicating "micro-services" that all run in parallel, e.g., within a Container Orchestration Engine (COE), such as Kubernetes, Docker Swarm, or OpenShift. Each Orchestration Engine takes an image that contains an application, its dependencies, and a small Operating System (OS) distribution in a layered filesystem, and it creates a process within its own namespaces on a hardware node. This deployment paradigm requires new methods for detecting intrusions in individual containers from system call traces, and products (such as Sysdig and Capsule8) have entered the market to provide DevOps teams with in-depth container telemetry based on system calls.

Existing solutions, however, rely on distributed data analysis over container telemetry to provide insights into potential anomalies on running containers. This introduces delay between the time an attack occurs on the end host, and when an analyst observes the incident produced by the analysis pipeline.

BRIEF SUMMARY

An intrusion detection system (IDS) method, apparatus and computer program product for a micro-services operating environment identifies attacks in substantially real-time and at a fine-grained (e.g. container-level) basis. According to this approach, behavior models are generated from container images, preferably using a binary analysis that is carried out in an off-line process. In particular, a behavior model for a container image is generated by statically determining what library functions a given binary calls out to and, in particular, by examining its inter-procedural call-graph, and then finding all system calls reachable from this graph. The behavior model that results from this analysis is a graph data structure having a set of nodes, and a set of edges, wherein a node represents one of: a process, a file, or a network socket, and wherein an edge represents a system call made by at least one process represented in the graph data structure. Once generated, the behavior model is co-located with a running container, thereby enabling detection of anomalies as the container executes in a container environment on a hardware node. In particular, a per-container IDS function is instantiated by checking whether system call telemetry generated by an image's running container satisfies the associated behavior model that has been generated for the container image by the binary analysis. If the telemetry indicates activity that deviates from the behavior model, e.g., by some configurable degree or based on some given occurrence, an automated action is then initiated to attempt to address the attack, preferably while it is in progress.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
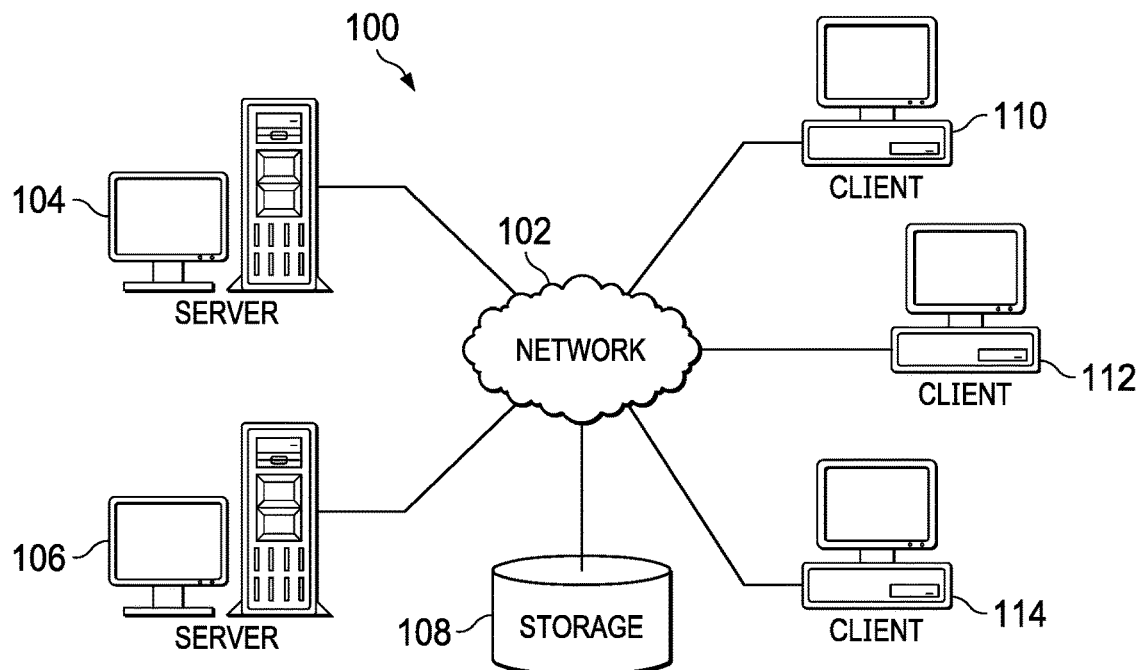
FIG. 1 depicts an exemplary block diagram of a distributed data processing environment in which exemplary aspects of the illustrative embodiments may be implemented.
Figure 2:
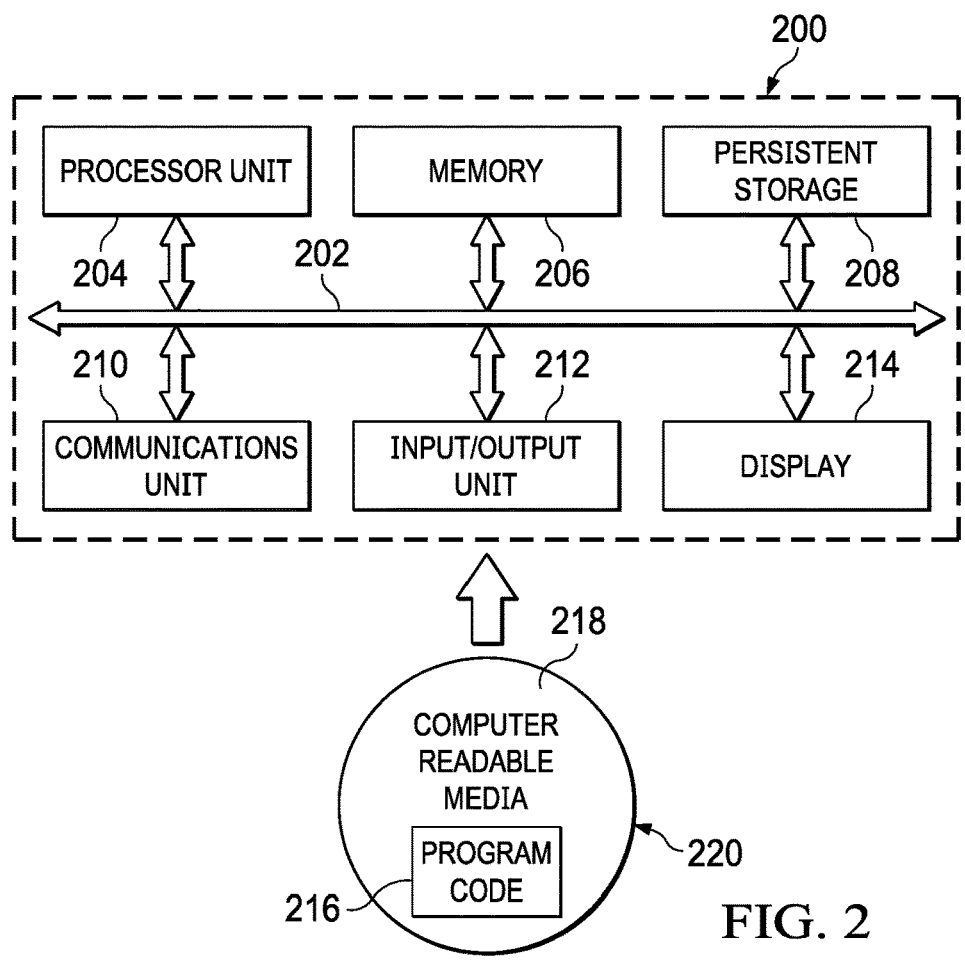
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided, in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212.

The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
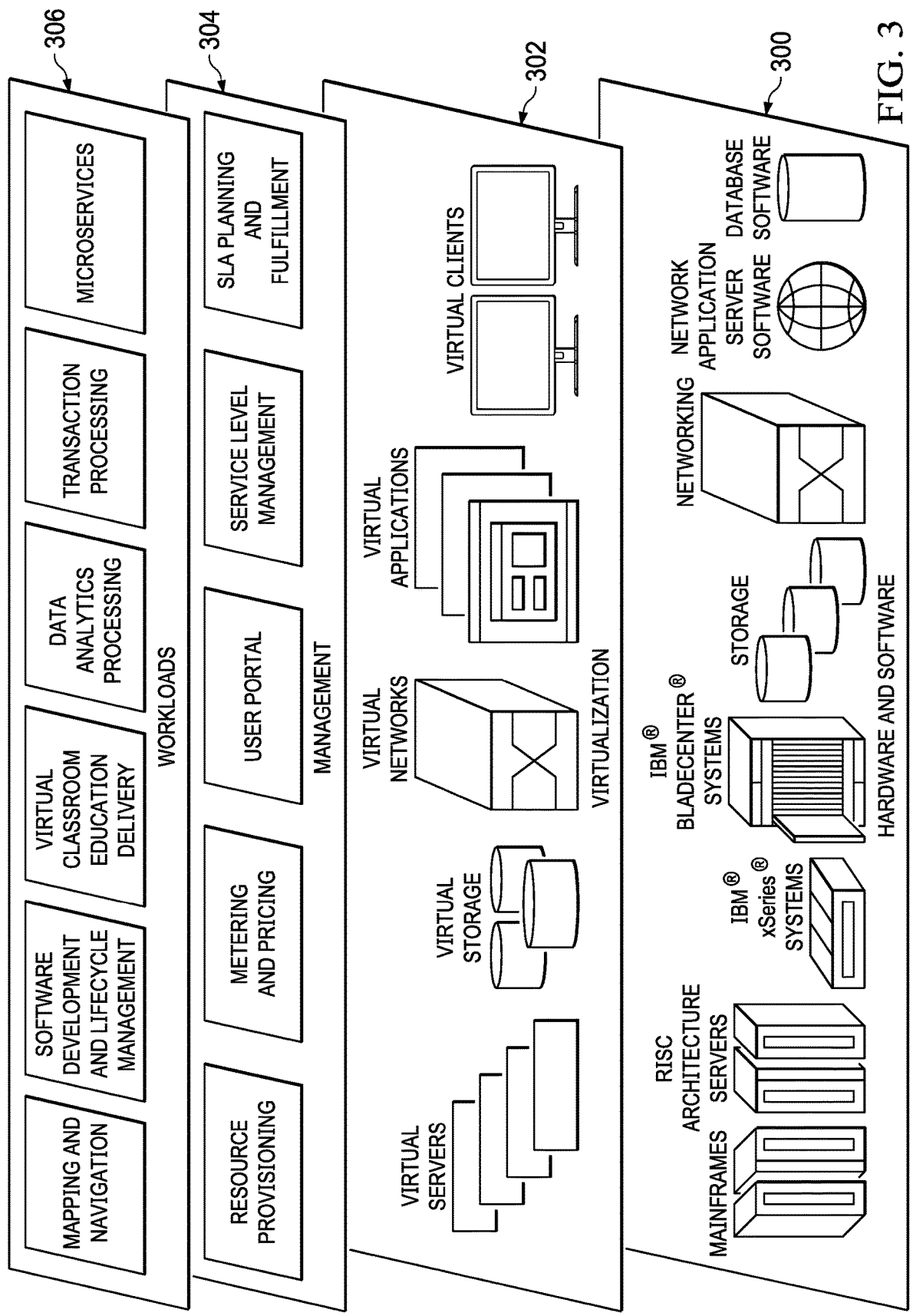
FIG. 3 depicts a representative cloud computing environment in which the techniques of this disclosure may be practiced.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; micro-services, and others (e.g., enterprise-specific functions in a private cloud).

It is understood in advance that although this disclosure includes a detailed description on cloud computing, implementation of the teachings recited herein are not limited to a cloud computing environment. Rather, embodiments of the disclosed subject matter are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. A virtual machine is an operating system or application environment that is installed on software, but that imitates a hardware machine. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Most cloud-based services available today are delivered through either bare metal or virtual machines (VMs), however, "container" technologies may also be used. Bare metal environments are those wherein applications are installed, run, and delivered from a base of dedicated cloud infrastructures and OS platforms. Such environments use dedicated and specific hardware and operating system configurations. A virtual machine, in contrast, is a complete guest host running inside of a host system. When virtual machines are used, applications are installed, packaged, and run under the control of a hypervisor, which virtualizes the hardware environment. Containers, on the other hand, provide an operating environment wherein only the essential parts of the application (sometimes referred to as cloud services) and its dependencies are included, and there can be multiple containers running within a single instance of an operating system, such as Linux. Docker is a virtualization platform that shares a single Linux kernel with all running instances (called containers). Other container-based technologies include, among others, Kubernetes, and OpenShift. These container implementations share many characteristics.

For example, a single Docker container is lightweight, as it is running on a shared kernel, making efficient use of available resources. Containers are used extensively by many next-generation cloud Platform as a Service (PaaS) developers. Thus, for example, and without limitation, IBM® Bluemix™ is a PaaS cloud platform that uses IBM Containers to run Docker containers. Because a Docker container runs on the existing operating system and shared binaries, it is more compact than a VM; thus, a container solution is often faster and has less memory requirements.

A typical Docker architecture comprises a set of components, a Docker client, a Docker host, and a Docker registry. A Docker client communicates with a Docker host by sending it a command (e.g., a CLI command) that Docker can understand. A Docker host is a computer- or cloud-based platform that executes the request from the CLI Docker client. The Docker registry stores Docker images that have been published and registered. A Docker host pulls images from its associated registry as needed. In a typical operation, a Docker client asks a Docker host for an image/container. If the image is available on the host, the host spins up and runs the image; if the image is not there, the host can use the registry and attempt to locate and download it. Running images are containers. Images are a frozen copy of your application. When an image is spun up, has memory and coordinates with the kernel, it becomes a container.

Micro-services (sometimes referred to as microservices) is an application architectural style in which an application is composed of many discrete, network-connected components called micro-services. In this approach to application design and management, large monolithic applications are broken into small services. A single network-accessible service is the smallest deployable unit for a micro-services application. Typically, each micro-service is optimized for a single function and runs in its own process. Communications between micro-services typically are conducted through RESTful APIs and message broker services. Preferably, a micro-service is configured to be continuously integrated (CI) and continuously delivered (CD). Businesses that employ micro-services receive many benefits including efficiency, simplified deployment and maintenance, improved application quality, and scalability.

Because a micro-service is usually just a single task, is language-agnostic and does not require significant dependences, it is well-suited to implementation in a container-based operating environment. As noted above, application developers regularly split large distributed systems into communicating micro-services that all run in parallel, e.g., within a Container Orchestration Engine (COE), such as Kubernetes, Docker Swarm, or OpenShift. Each Orchestration Engine takes an image that contains an application, its dependencies, and a small Operating System (OS) distribution in a layered filesystem, and it creates a process within its own namespaces on a hardware node.

Intrusion Detection

Figure 4:
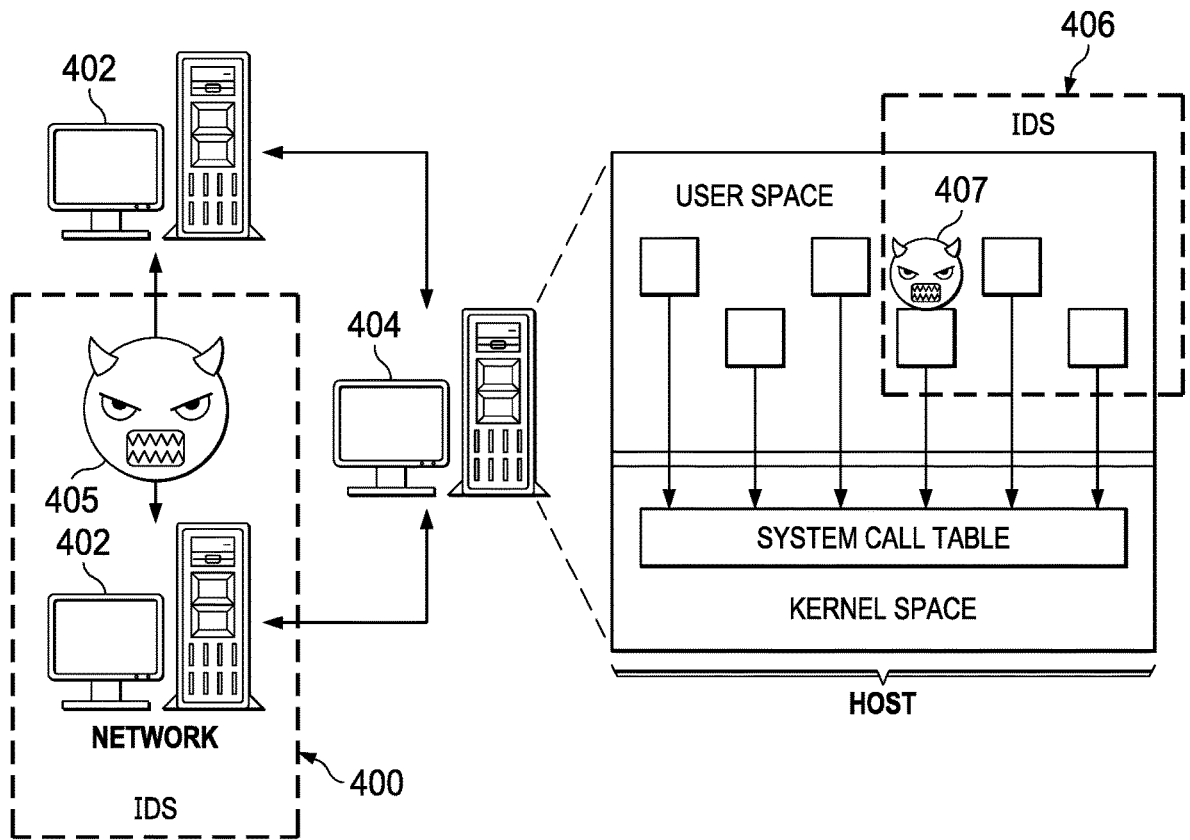
FIG. 4 depicts several implementations for an intrusion detection system in association with a network operating environment.

As mentioned above, Intrusion Detection Systems (IDS) are a well-established technology for defending whole networks and individual hosts from attackers. FIG. 4 depicts these typical use cases. On the left side, an IDS 400 is operated in the network 402 that includes multiple hosts 404 in an attempt to detect and mitigate network-based attack 405. On the right side, an IDS 406 executes in association with a particular host 408 in an attempt to detect and mitigate a host-based attack 407.

Figure 5:
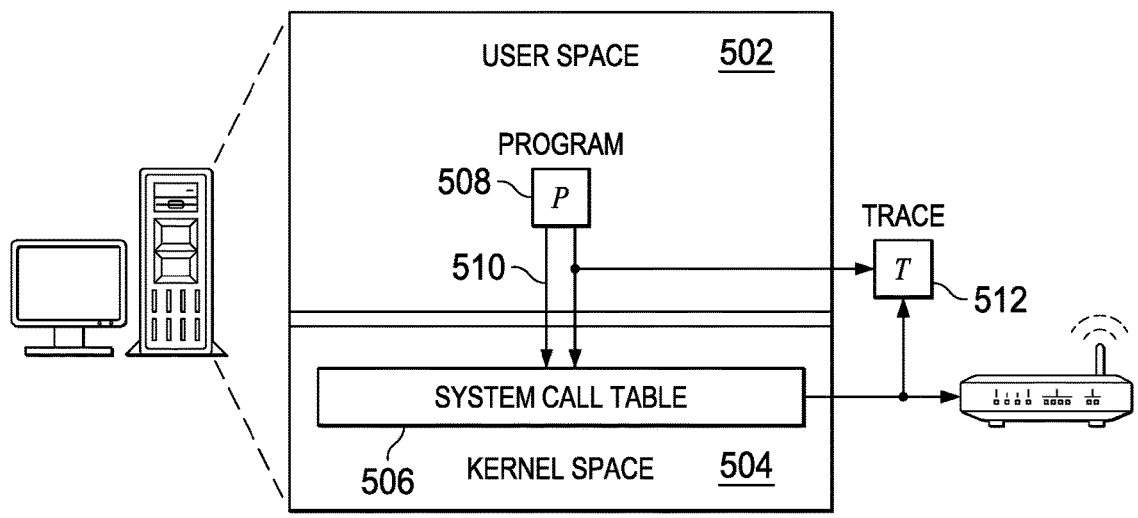
FIG. 5 depicts a host-based intrusion detection system (IDS) in which the techniques of this disclosure may be associated.

FIG. 5 depicts a typical host-based Intrusion Detection System (IDS) 500 is implemented in association with a host operating system having a kernel space 502, and a user space 504. A System Call Table 506 is accessible in the kernel space 502. A program P 508 executes in user space 504 and makes system calls 510 to the host's kernel via the table 506. The IDS 500 implemented in this operating context traces system calls that the program makes to the host's kernel in order to detect activity that deviates from normal behavior. Normal behavior can be defined as a model extracted from an application, rules manually specified by an administrator, or models inferred from benign program traces. Thus, for example, the IDS 500 implements a model M for program P, and the IDS checks whether $M \models T$. Automata-based IDS approaches involve defining automata $A \leftarrow P$ and checking whether $A$ accepts $T$. Machine learning (ML)/data mining IDS approaches define a classifier $F$ and training data $D$, and check $F_D$=Benign. Generating the benign model, however, can be difficult because it may not be possible to see all portions of the application that are executing; also, it can be difficult to know whether the traces being used to build the benign model are truly benign.

The above-described approaches also do not scale efficiently in the context where micro-services are implemented in a container-based environment.

Intrusion Detection in Micro-Services Through Binary Analysis and Container Telemetry With the above as background, the techniques of this disclosure are now described.

Figure 6:
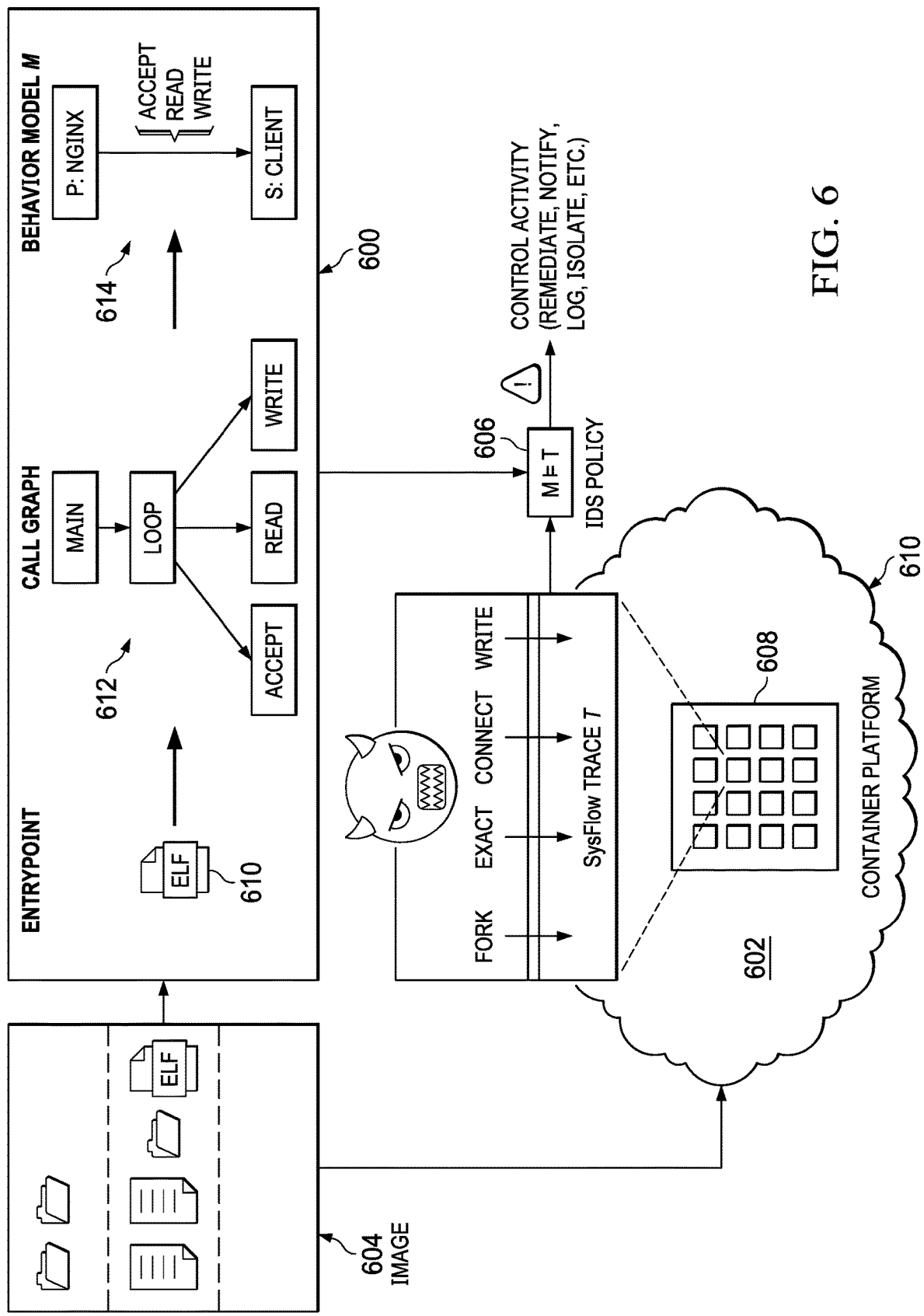
FIG. 6 depicts a framework of this disclosure in which a binary analysis of container images is performed, preferably off-line, to build a library of behavior models against which container telemetry is then analyzed in real-time for intrusion detection.

FIG. 6 is a high-level depiction of an IDS approach according to this disclosure. As depicted, the approach involves two components, an automated binary analysis 600 for producing behavioral models for container images, and the on-node detector 602 that checks whether telemetry produced by a given container satisfies its behavioral model. The on-node detector 602 operates generally to capture system call trace telemetry, in the manner described above. FIG. 6 thus depicts the full end-to-end execution of the IDS when given a container image 604 as input. In this example, the container image 604 has been previously processed by the automated binary analysis 600, preferably in an off-line manner, to generate an associated behavior model M. An IDS for this image is then defined by checking 606 (e.g., $M \models T$) whether the system call trace telemetry generated by the image's running container (in the example running in a hardware node 608 in a Container Orchestration Engine (COE) 610 (here, running Kubernetes)) satisfies its associated behavioral model. If the behavior model is satisfied, no intrusion is detected; if the behavior model is not satisfied, an intrusion (or, more generally, an anomaly) is indicated and some automated action (e.g., mitigation, notification, sandboxing, logging, etc.) may then be taken.

As depicted, the automated binary analysis 600 generates the behavior model for the container image (e.g., a Docker image) 604 with binary entry points (e.g., C/C++ programs). As shown in FIG. 6, and as explained in more detail below, the automated binary analysis takes an ELF 610 as input. ELF (Executable and Linking Format) is a standard binary format on operating systems such as Linux®. The ELF representation of control data in an object file is platform independent, and this type of representation permits object files to be identified, parsed, and interpreted similarly, making the ELF object files compatible across multiple platforms and architectures of different size. The three main types of ELF files are: Executable, Relocatable, and Shared object. These file types hold the code, data, and information about the program that the operating system and linkage editor need to perform the appropriate actions on these files. As depicted, the ELF 610 for the container image is received and a call graph 612 is generated.

In particular, and given the container image as input, the modeling analysis produces the behavior model 614 that summarizes how containers that run off of that image interact with other processes, the filesystem, or the network. Preferably, the behavior model M produced by this process is a graph data structure 612, where nodes in the graph represent resources, including processes, files, or network sockets, and edges in the graph represent system calls made by a process in the graph. A given sequence of system calls is valid if there exists a path in the behavior model M that matches the sequence, starting from the node that produced the sequence of system calls.

Figure 7:
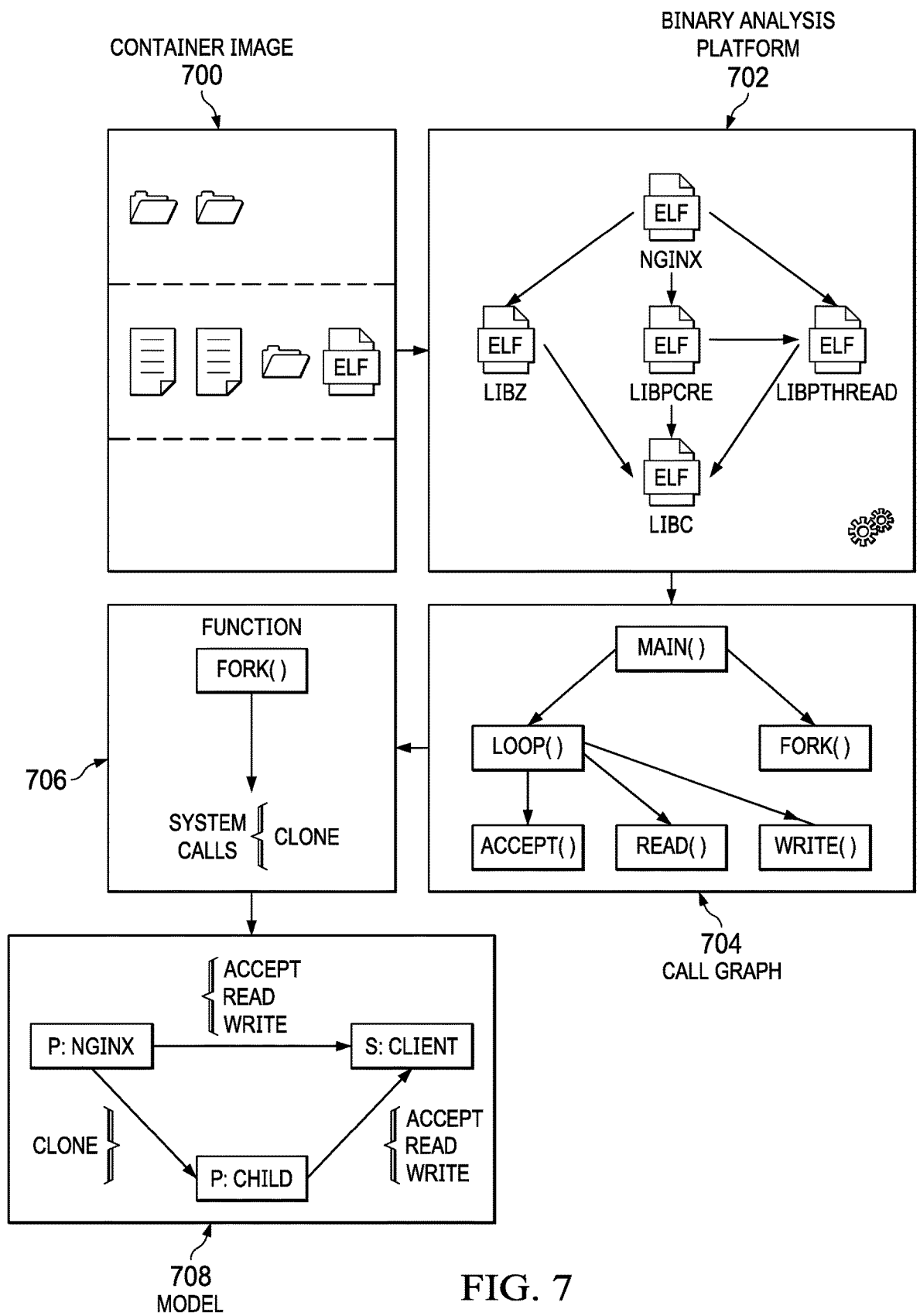
FIG. 7 depicts a representative binary analysis process of this disclosure.

FIG. 7 depicts the automated binary analysis process in additional detail. As shown, the container image 700 comprises a data set, and the ELF. The ELF is the executable file representing the process or application that will run in the container. The image 700 is input to a binary analysis platform (BAP) 702, which generates a static behavior model for the image. Typically, BAP 702 operates as an automated process or set of processes, executing as software in one or more hardware processors. Although FIG. 7 depicts a single container image 700, the process is repeated for multiple container images to build a library of behavioral models. In operation, the BAP 702 takes an entrypoint of a container image (e.g., in this case nginx) and finds all of its library dependencies located on the image. From this information (and in particular the entrypoint), BAP 702 constructs a call graph 704 and, at 706, outputs the leaves of the call graph that refer to functions in other libraries. This procedure is repeated on every library dependency to identify a set of functions that the entrypoint and its dependencies require from the standard C library (libc). For every function $f$ required from libc, that function is then microexecuted. Preferably, the binary analysis approach optimizes this step by defining an ABI (Application Binary Interface) for the standard C library that wraps previously microexecuted behaviors, or that allows analyses to be customized, e.g., by manually defining ABI function wrappers. Further, and for efficiency, preferably a similar approach is employed for other shared libraries (i.e., dynamically linked libraries) to expedite the analysis.

Referring back to FIG. 7, BAP 702 then explores each possible execution path in function $f$, and observes the value of the RAX register (familiarity with Linux OS kernel semantics is presumed) when encountering a syscall instruction. BAP 702 then outputs a set of observed values for RAX as the set of system calls made by function $f$. Preferably, and for efficiency, BAP then limits the output to only those system calls (e.g., execve) that affect the process lifecycle or interact with the filesystem or network. BAP 702 then creates the behavior model 708, preferably with a single node representing the running container for this image. BAP then revisits the original call graph 704 for the entrypoint, and it performs a preferably Depth First Search (DFS) traversal on the graph. Whenever this search encounters a function from libc, a check is then made to determine whether the identified function makes any system calls of interest. If so, these system calls are then added to the edge that connects the calling process to the resource the libc function modifies. If no such edge exists, a node for the resource is created and an edge to it is added from the calling process. The behavioral model M that results from this process is then depicted at 708.

As an optimization of the above-described process, valid sequences of system calls are encoded into the behavior model, e.g., using static taint analysis. In particular, and given functions that create processes or open files and sockets, a taint analysis enriches the behavior model by finding the sequence of functions that receive a given resource as input. For every function, the call graph is queried to see the system calls it may make. The identified sequence of system calls is then embedded into the behavior model, e.g., as a path originating from the resource node. For every system call in the sequence, a new edge is created to a new node, if it does not already exist.

Figure 8:
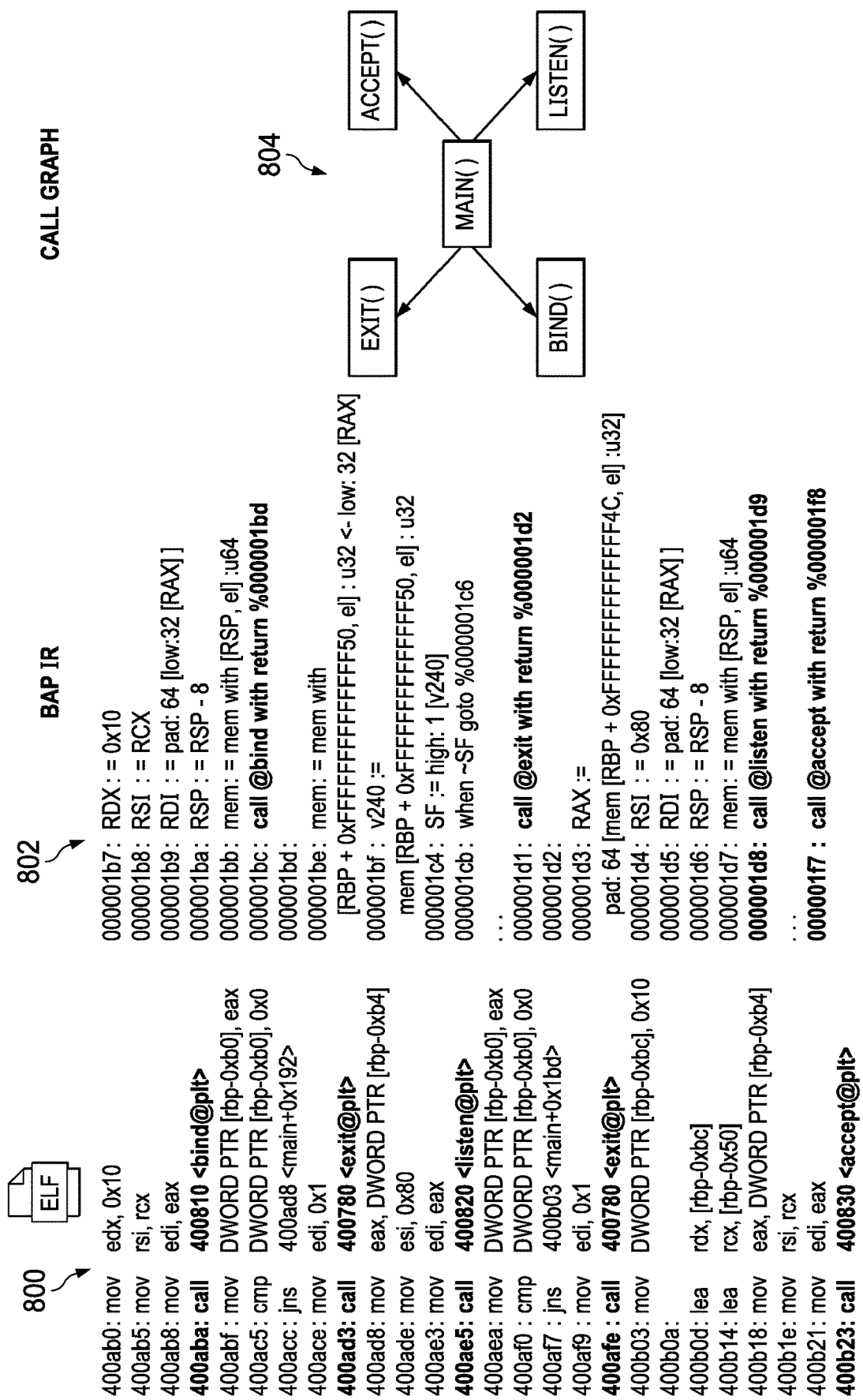
FIG. 8 depicts an example of how the binary analysis builds a call graph from a container image.
Figure 9:
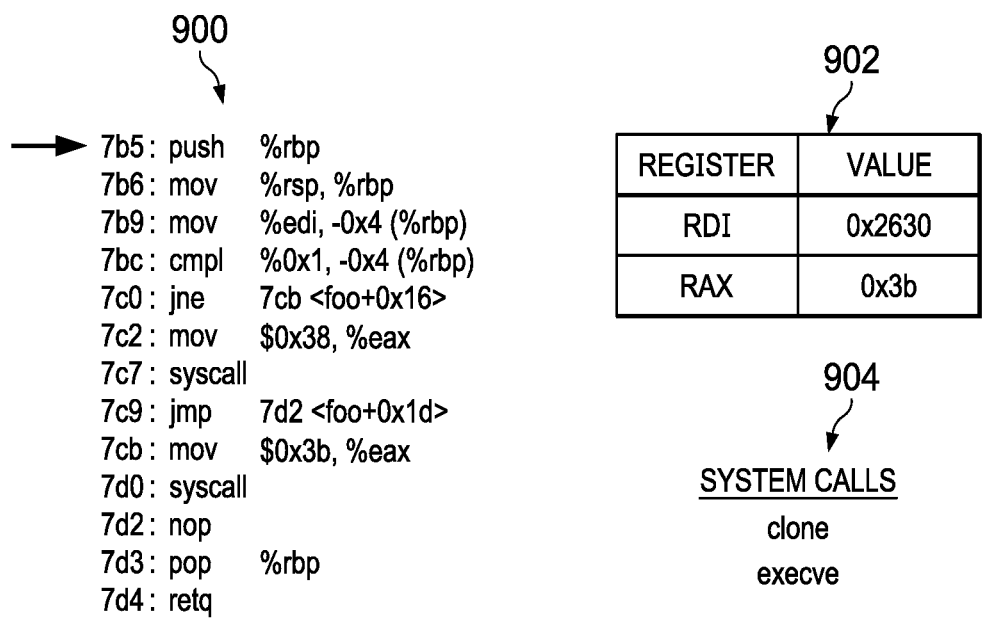
FIG. 9 depicts an example of how the binary analysis identifies system calls of interest.

FIG. 8 depicts an example of how to construct a call graph from a binary representation. In this example, a portion 800 of container image (containing the main program) is shown. In the manner described above, the binary analysis platform BAP creates an intermediate representation (IR) 802, which in turn is processed to generate the call graph 804. FIG. 9 depicts an example of how BAP detects system calls within a program micro-execution. The assembly code instructions 900 on shown on the left, and the RAX register value 902 is shown on the right. In this example, the system calls 904 identified are clone and execve.

Figure 10:
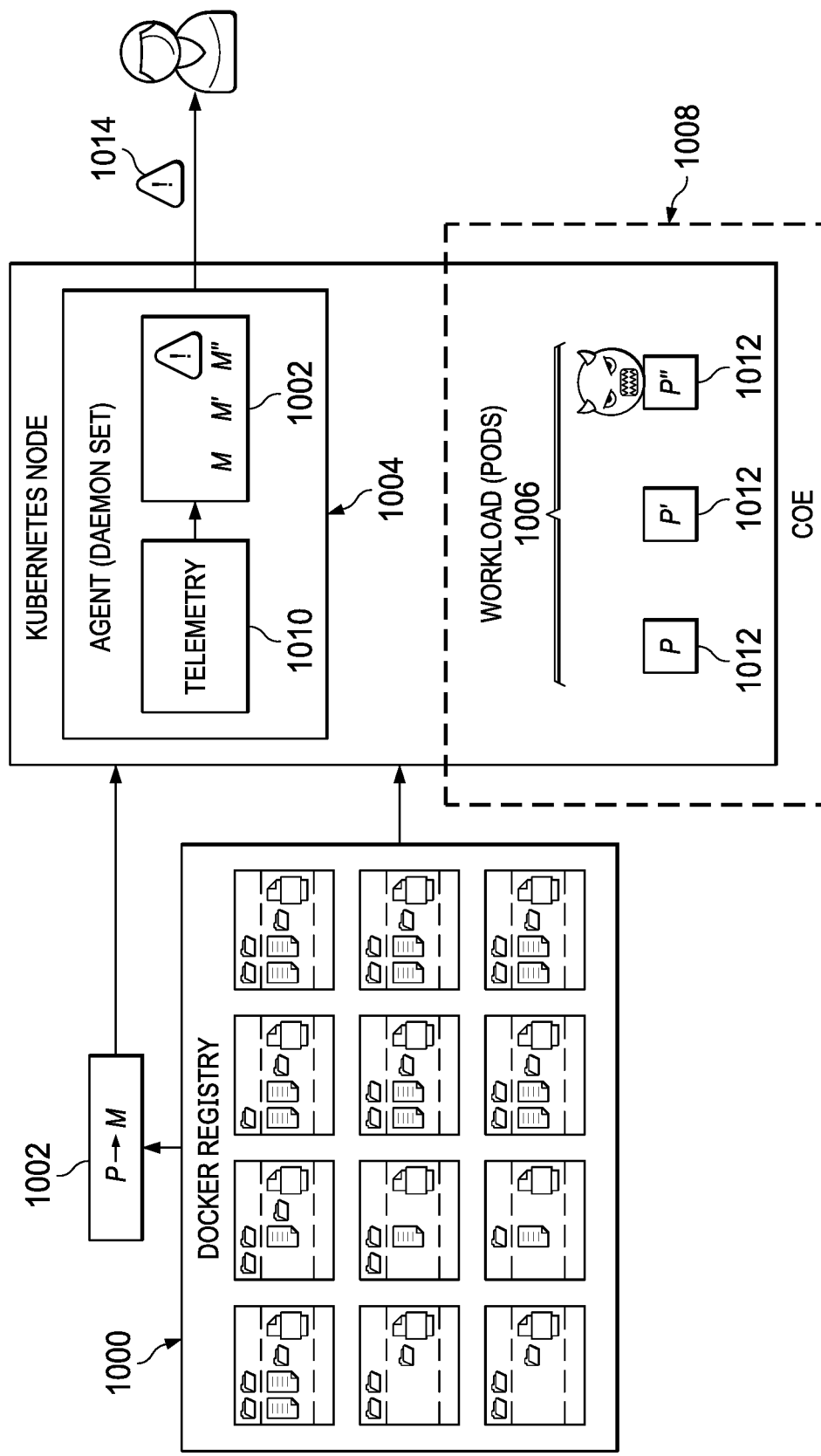
FIG. 10 depicts an intrusion detection system (IDS) agent implemented in association with a hardware node to real-time monitor system call telemetry for intrusion detection.

After the behavior model is generated for a given container image, preferably the model is imported into an Intrusion Detector System (IDS) agent that runs alongside containers within a hardware node in the Container Orchestration Engine (COE). A representative deployment architecture is depicted in FIG. 10. As depicted, a registry 1000 of container images have been subjected to the binary analysis processing described above to build the library of behavior model(s) corresponding to the container images in the registry. Formally, a particular container image corresponds to a micro-service P and has an associated behavior model 1002 M, such that P→M. Although just one model 1002 is depicted, there are of course a set of such models, typically one per container image. Moreover, while typically there is a one-to-one relationship between a container image (more specifically, its main program as invoked by the container entrypoint) and its associated behavior model, this is not necessarily a limitation; a particular behavior model also may correspond to more than one container image, and a particular container image may also have more than one associated behavior model.

As also depicted, the behavior model is imported into the agent 1004 that runs alongside the containers within the hardware node 1006 of COE 1008. The agent 1004 typically executes as software and consumes one or more sources of telemetry 1010 commonly used for host monitoring (e.g., Sysflow T, audit logs, system calls, etc.) for all the containers (not shown) running on a given hardware node. Thus, and as depicted for example, agent 1004 consumes the system call telemetry generated by each program 1012, namely program P, P' and P". In this example, program P" is under attack. In operation, the agent 1004 continuously checks whether the system call trace for each program satisfies a given container's behavior model. In this implementation, IDS agent 1004 does not require a specific implementation of container telemetry. Preferably, there is one and only one agent 1004 running on every hardware node 1006 within the COE 1008, and preferably that agent has the ability to trace the system calls made by processes running in a specific namespace (i.e. a container). As a further optimization, preferably the telemetry implementation summarizes system call information in a compact form, so that the agent 1004 keeps relevant information in-memory and does not have to utilize disk or network storage to save traces. This is not a requirement, however.

As noted above, when the agent determines that the container is not operating in a manner consistent with the behavior specified in the associated behavior model, a given action is taken. In this example, an administrator or computing entity is alerted at 1014.

In one example embodiment, the IDS agent 1004 uses the following procedure to check whether a given trace satisfies a container's behavior model. In particular, and given a sequence of system calls c in the trace, the agent checks whether there exists a path in the behavior model where the edges in the path match the sequence. If a path is found, and if the nodes along the path match the arguments given in the trace, the agent accepts c and continues execution. If a path is found, but the nodes along the path contain no arguments (meaning that the model permits the sequence c over all inputs), the agent accepts c and resumes execution. If no path is found, the agent rejects c, generates an external alert (e.g. for an analyst), and resumes execution. Preferably, the choice of what length of system calls to consider in the agent depends on the availability of resources on the agent, and the tolerance for false positives in the results. A simple model considers sequences of length 1 and simply checks whether the behavior model contains individual system calls. More complex models verify longer series of system calls with the added expense of requiring more resources for the agent.

Figure 11:
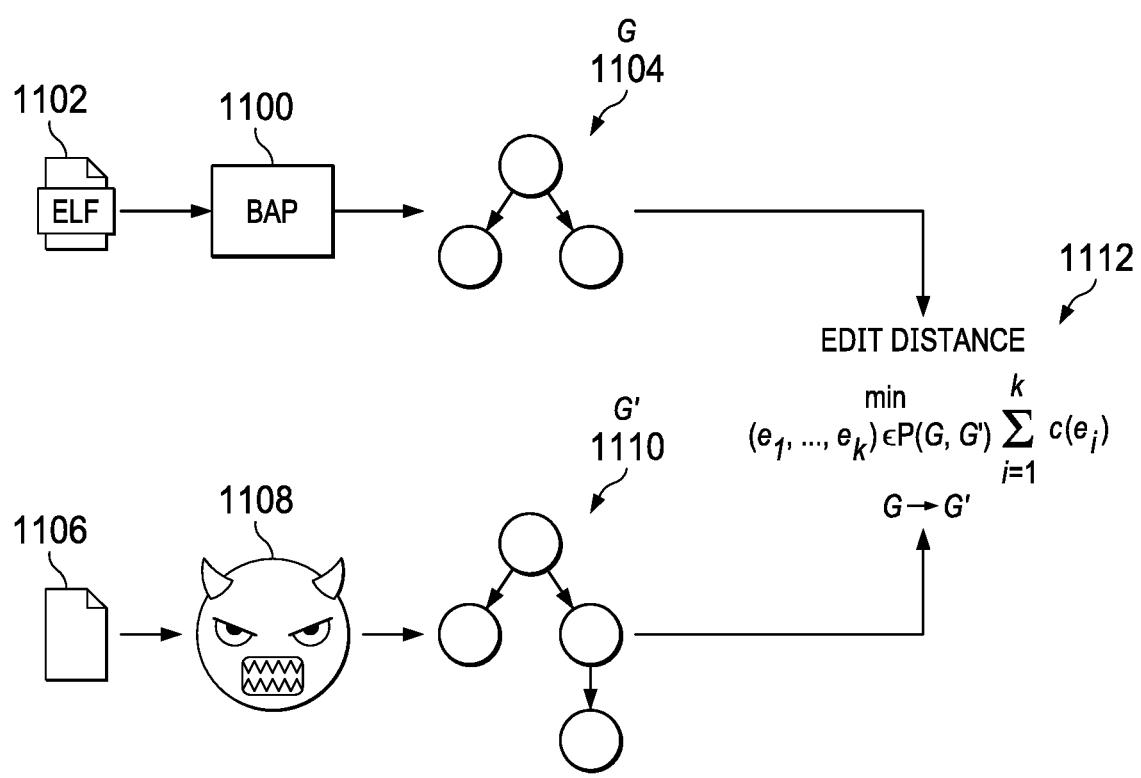
FIG. 11 depicts how the agent determines whether activity that is inconsistent with the behavior model is identified.

FIG. 11 depicts the basic operation of the IDS agent. As noted above, and using the binary analysis platform 1100, the ELF 1102 associated with the container image is converted into the call graph G 1104 and the associated behavior model During run-time execution of the container 1106, assume that some attack 1108 is occurring. This attack is evident in the system calls that are monitored and that correspond to the modified call graph G' 1110. By computing edit distance function 1112, the agent determines that an unacceptable deviation from the behavior model has occurred. Upon this determination, a given action is then taken. The nature of the given action varies based on implementation but typically is an automated response that includes one of: terminating the container, logging an alert, issuing a notification, issuing a command to isolate (sandbox) the container, issuing a command to another device or system for mitigation, remediation, logging, alerting and the like. In one embodiment the edit distance G→G' used to trigger automated taking of the given action is computed as $$\min_{(e_1,\ldots,e_k) \in P(G,G')} \sum_{i=1}^{k} c(e_i),$$

wherein c is the sequence of system calls, and $e_i$ is the $i^{th}$ edge of the call graph.

As a skilled person will appreciate, typically any static model generated from a container image will not contain all the arguments that will be given to system calls over the lifetime of a container. For this reason, preferably the system also provides for a feedback operation to enrich the behavior model running on the agent, e.g., by the agent taking a consensus of similar containers running on its node. For every valid system call s observed in a trace, if the agent sees the same arguments appear across multiple containers, the arguments are then added to the node that s connects to in the behavior model. An adversary would then have to compromise multiple containers simultaneously in order to successfully poison this model.

Summarizing, this disclosure provides a framework and procedure for generating behavior models from container images, preferably using binary analysis. These models preferably are generated by statically-determining what library functions a given binary calls out to and, in particular, by examining its inter-procedural call-graph, and then finding all system calls reachable from this graph. An IDS is then defined that checks whether the telemetry generated by an image's running container satisfies its associated behavior model. Behavior models are built from container images accessible from a registry. These models preferably are sufficiently compact that are co-located with running containers and detect anomalies in real-time (or substantially real-time) if and when they occur on the associated hardware node. An intrusion detection system according to this disclosure generates the behavior models through an automated offline analysis, and it detects intrusions immediately when they occur on the hardware node running a given container.

According to a variant embodiment, the IDS agent (or an IDS that incorporates such agent processes) accesses a library of behavior models for the container images that have been built previously and are available for retrieval. In other words, according to this variant, there is no requirement that the IDS (that includes the agents) be the same process that executes the off-line binary analysis.

Typically, there is a behavior model associated with a particular container image, and that container image corresponds to a particular micro-service that generates telemetry upon execution in a runtime (COE) environment. Although the technique assumes that the container image corresponds to a micro-service, this is not a limitation, as the approach herein may be used with any program that has an associated behavior model.

The technique herein is not specific to any particular application model, and it may be implemented in client-side or server-side configurations. Indeed, even applications that are implemented entirely server-side or have a significant server-side component can be built on a micro-services (or an SOA) model and thereby benefit.

One or more aspects of the technique may be performed in a cloud computing environment (FIG. 3), or otherwise leverage cloud-compute resources.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

The techniques herein are not limited to use with a micro-services-based application, although this type of application implementation benefits significantly from the approach. Indeed, the approach may also be used in an execution environment based on monolithic models, object-oriented models, and others.

The scheme described herein may be implemented in or in conjunction with various server-side architectures other than cloud-based infrastructures. These include, without limitation, simple n-tier architectures, web portals, federated systems, and the like.

Still more generally, the subject matter described herein can take the form of an entirely hardware embodiment, an entirely software embodiment or an embodiment containing both hardware and software elements.

Furthermore, the behavior modeling and IDS functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the components are implemented in a special purpose computer, preferably in software executed by one or more processors. The software also is maintained in one or more data stores or memories associated with the one or more processors, and the software may be implemented as one or more computer programs.

The function may be implemented as an adjunct or extension to an existing security service, or access manager solution. The technique also may be implemented in an automated manner, as has been described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., container-based operating environment, and micro-services.

While real-time container telemetry is preferably used for comparison against the behavior models, an alternative embodiment may involve the use of recorded system call traces.

Further, while in a preferred embodiment the telemetry that is analyzed for anomaly detection is a set of captured system call traces, other diagnostic information, such as obtained by monitoring inbound or outbound data packets, by examining files, memory usage, and the like, may be utilized.

What is claimed is as follows:

1. A method for intrusion detection in a run-time container environment, comprising:

deploying a behavior model in association with a container executing in the run-time container environment, the behavior model having been generated from a container image and one or more library dependencies of the container image, the behavior model being a graph data structure having a set of nodes, and a set of edges, wherein a node represents one of: a process, a file and a network socket, and wherein an edge represents a system call made by at least one process represented in the graph data structure;

as the container image executes in the container, receiving system call telemetry;
responsive to receipt of the telemetry, determining whether the container image is executing in a manner inconsistent with the behavior model, thereby indicating an anomaly; and
upon a determination that the container image is executing in a manner inconsistent with the behavior model, taking an automated action to attempt to address the anomaly.

2. The method as described in claim 1 further including generating the behavior model for the container image by identifying the library dependencies.

3. The method as described in claim 2 wherein the behavior model is generated by a binary analysis that determines what library functions a given binary calls.

4. The method as described in claim 3 wherein the binary analysis determines what library functions a given binary calls by examining an inter-procedural call graph and finding a set of system calls reachable from the call graph.

5. The method as described in claim 3 wherein the binary analysis generates the behavior model by micro-executing code reachable from an entrypoint of the container image.

6. The method as described in claim 1 wherein the behavior model is instantiated in a hardware node in a Container Orchestration Engine (COE), and wherein the container image executes as a micro-service.

7. The method as described in claim 6, further including enriching the behavior model based on information representing one or more valid system calls seen by one or more other containers running on the hardware node.

8. The method as described in claim 1, wherein determining whether the container image is executing in a manner inconsistent with the behavior model is carried out continuously and the automated action is one of: mitigation, notification, sandboxing and logging.

9. Apparatus, comprising:
at least one hardware processor;
computer memory holding computer program instructions executed by the at least one hardware processor to perform intrusion detection in association with a container environment, the computer program instructions comprising program code configured to:
deploy a behavior model in association with a container executing in the run-time container environment, the behavior model having been generated from a container image and one or more library dependencies of the container image, the behavior model being a graph data structure having a set of nodes, and a set of edges, wherein a node represents one of: a process, a file and a network socket, and wherein an edge represents a system call made by at least one process represented in the graph data structure;
as the container image executes in the container, receive system call telemetry;
responsive to receipt of the telemetry, determine whether the container image is executing in a manner inconsistent with the behavior model, thereby indicating an anomaly; and
upon a determination that the container image is executing in a manner inconsistent with the behavior model, take an automated action to attempt to address the anomaly.

10. The apparatus as described in claim 9 wherein the computer program code is further configured to generate the behavior model for the container image by identifying the library dependencies.

11. The apparatus as described in claim 10 wherein the behavior model is generated by a binary analysis that determines what library functions a given binary calls.

12. The apparatus as described in claim 11 wherein the binary analysis determines what library functions a given binary calls by examining an inter-procedural call graph and finding a set of system calls reachable from the call graph.

13. The apparatus as described in claim 11 wherein the binary analysis generates the behavior model by micro-executing code reachable from an entrypoint of the container image.

14. The apparatus as described in claim 9 wherein the behavior model is instantiated in a hardware node in a Container Orchestration Engine (COE), and wherein the container image executes as a micro-service.

15. The apparatus as described in claim 14, wherein the program code is further configured to enrich the behavior model based on information representing one or more valid system calls seen by one or more other containers running on the hardware node.

16. The apparatus as described in claim 9, wherein the program code configured to determine whether the container image is executing in a manner inconsistent with the behavior model executes continuously and the automated action is one of: mitigation, notification, sandboxing and logging.

17. A computer program product in a non-transitory computer-readable medium for use in a data processing system, the computer program product holding computer program instructions executed by the data processing system to perform intrusion detection in association with a container environment, the computer program instructions comprising program code configured to:
deploy a behavior model in association with a container executing in the run-time container environment, the behavior model having been generated from a container image and one or more library dependencies of the container image, the behavior model being a graph data structure having a set of nodes, and a set of edges, wherein a node represents one of: a process, a file and a network socket, and wherein an edge represents a system call made by at least one process represented in the graph data structure;
as the container image executes in the container, receive system call telemetry;
responsive to receipt of the telemetry, determine whether the container image is executing in a manner inconsistent with the behavior model, thereby indicating an anomaly; and
upon a determination that the container image is executing in a manner inconsistent with the behavior model, take an automated action to attempt to address the anomaly.

18. The computer program product as described in claim 17 wherein the computer program code is further configured to generate the behavior model for the container image by identifying the library dependencies.

19. The computer program product as described in claim 18 wherein the behavior model is generated by a binary analysis that determines what library functions a given binary calls.

20. The computer program product as described in claim 19 wherein the binary analysis determines what library functions a given binary calls by examining an inter-procedural call graph and finding a set of system calls reachable from the call graph.

21. The computer program product as described in claim 18 wherein the binary analysis generates the behavior model by micro-executing code reachable from an entrypoint of the container image.

22. The computer program product as described in claim 17 wherein the behavior model is instantiated in a hardware node in a Container Orchestration Engine (COE), and wherein the container image executes as a micro-service.

23. The computer program product as described in claim 22, wherein the program code is further configured to enrich the behavior model based on information representing one or more valid system calls seen by one or more other containers running on the hardware node.

24. The computer program product as described in claim 17, wherein the program code configured to determine whether the container image is executing in a manner inconsistent with the behavior model executes continuously and the automated action is one of: mitigation, notification, sandboxing and logging.

* * * * *